United States Patent [19]
Smesko et al.

[11] Patent Number: 5,716,728
[45] Date of Patent: Feb. 10, 1998

[54] ALKALI METAL ELECTROCHEMICAL CELL WITH IMPROVED ENERGY DENSITY

[75] Inventors: Sally Ann Smesko, North Tonawanda; Esther S. Takeuchi, East Amherst; William M. Paulot, Lancaster, all of N.Y.

[73] Assignee: Wilson Greatbatch Ltd., Clarence, N.Y.

[21] Appl. No.: 742,670

[22] Filed: Nov. 4, 1996

[51] Int. Cl.$^6$ .................................................. H01M 4/36
[52] U.S. Cl. ........................... 429/60; 429/233; 429/245; 29/623.1
[58] Field of Search ........................... 429/60, 218, 194, 429/233, 245; 29/623.1

[56] References Cited

U.S. PATENT DOCUMENTS

| | | | |
|---|---|---|---|
| 3,536,532 | 10/1970 | Wantanabe et al. | 136/83 |
| 3,658,592 | 4/1972 | Dey | 136/6 |
| 3,700,502 | 10/1972 | Watanabe et al. | 136/6 |
| 4,091,188 | 5/1978 | Dey | 429/174 |
| 4,172,927 | 10/1979 | Toyoguchi et al. | 429/194 |
| 4,410,609 | 10/1983 | Peled et al. | 429/105 |
| 4,693,950 | 9/1987 | Moshtev et al. | 429/194 |
| 4,830,940 | 5/1989 | Keister et al. | 429/194 |
| 5,114,811 | 5/1992 | Ebel et al. | 429/194 |
| 5,246,795 | 9/1993 | Megahed et al. | 429/185 |
| 5,250,373 | 10/1993 | Muffoletto et al. | 429/161 |
| 5,322,746 | 6/1994 | Wainwright | 429/60 |
| 5,344,724 | 9/1994 | Ozaki et al. | 429/94 |
| 5,443,925 | 8/1995 | Machida et al. | 429/94 |
| 5,458,997 | 10/1995 | Crespi et al. | 429/218 |
| 5,561,006 | 10/1996 | Lecerf et al. | 429/218 |

OTHER PUBLICATIONS

Takeuchi, E.S. and Smesko, S.A., Performance aspects of low rate lithium/CFx cells, *Proc. Seventh Annual Battery Conference on Applications and Advances*, Long Beach, 92 BP-1, VI-1 (1992). (month N/A).

Fukuda, M. and Iijima, T. Lithium–carbon monofluoride cells, in *Lithium Batteries*, J.P. Gabano, Editor, pp. 211–239, Academic Press, London (1983). (month N/A).

Kawauchi, S., Okazaki, R., Miyoshi, J. and Kajikawa, Y., Long service life polycarbon monofluoride/lithium batteries for electronic watches, *Prog. Batteries Sol. Cells*, 4, 91–6, 1982 (month N/A).

Kawauchi, S., Kawakubo, E., Aoki, K., and Eza, M., High reliable polycrbon monofluoride/litium battery for memory back–up, *Prog. Batteries Sol. Cells* 4, 87–90 (1982). (month N/A).

Pagoria, D.D., Megahed, S.A., Lautzenhiser, J.L.; Ekern, R.J., Lithium/carbon monofluoride batteries for extended ultra–high temperature storage and surface mount applications, *Proc. Int. Power Sources Symp.*, 35, 7–9 (1992) month N/A.

Higgins, R.L., Energy density improvements in Li (lithium)/carbon monofluoride cells, *Proc. Power Sources Symp.*, 31, 323–30 (1984). month N/A.

Sandifer, J.R. and Suchanski, M.R., Electrochemical characteristics of the lithium/carbon monofluoride battery and its component half–cells, *J. Appl. Electrochem.*, 14, 329–40 (1984). month N/A.

Watanabe, J., Kawakubo, E., Shinagawa, T., and Kaijkawa, Y., Coin type lithium/polycarbon monofluoride batteries, *Prog. Batteris Sol. Cells*, 3, 74–80 1980, month N/A.

(List continued on next page.)

*Primary Examiner*—M. Nuzzolillo
*Attorney, Agent, or Firm*—Hodgson, Russ, Andrews, Woods & Goodyear LLP

[57] ABSTRACT

An alkali metal/solid cathode electrochemical cell, particularly a Li/CF$_x$ cell, having an electrolyte-to-cathode (E/C) weight ratio of about 0.94 to 0.96, and an anode-to-cathode (A/C) capacity ratio of about 1.03, is described. These ratios provide the cell with an improvement of about 6.7% in terms of volumetric energy density and about 11.9% in terms of gravimetric energy density over prior art Li/CF$_x$ cells.

46 Claims, 6 Drawing Sheets

OTHER PUBLICATIONS

Higgins, R.L. and Erisman, L.R., Applications of the lithium/carbon monofluoride battery, *Proc. Power Sources Symp.*, 28, 208–10 (1978). month N/A.

Okazaki, R., Aoki, K., Tsubaki, K., Iijima, T., and Morita, A., Poly(carbon monofluoride)–lithium battery, *Natl. Tech Rep.* 24, 281–90 (1978). month N/A.

Fukuda, M. and Iijima, T., Lithium/poly(carbonmonofluoride)cylindrical type batteries, *Power Sources, 5, Proc. 9th Intl. Symp.*, 713–28 (1975). month N/A.

Fukuda M. and Iijima, T., Practical lithium/poly(carbon monofluoride) battery system, *Rec. 10th Intersoc. Energy Convers Eng. Conf.*, 413–17 (1975). (month N/A).

Whittingham, M.S., Mechanism of reduction of the fluorographite cathode, *J. Electrochem. Soc.*, 122, 526–7 (1975). (month N/A).

PRIOR ART

ALKALI METAL ELECTROCHEMICAL CELL WITH IMPROVED ENERGY DENSITY

BACKGROUND OF THE INVENTION

1. Field of the Invention

The present invention generally relates to the conversion of chemical energy to electrical energy, and more particularly, to an alkali metal electrochemical cell having an electrolyte-to-cathode (E/C) weight ratio and an anode-to-cathode (A/C) capacity ratio specifically balanced to improve the energy density of the cell. A preferred cathode includes a solid active material and a most preferred cathode active material is a carbonaceous material such as fluorinated carbon.

2. Prior Art

Alkali metal/fluorinated carbon cells have been extensively discussed in the prior art. Examples include U.S. Pat. Nos. 3,536,532 and 3,700,502 to Watanabe et al.; 4,091,188 to Dey; 5,246,795 to Megahed et al.; 5,114,811 to Ebel et al. and 5,250,373 to Muffoletto et al. The latter two patents are assigned to the assignee of the present invention and incorporated herein by reference.

A prior art Li/fluorinated carbon cell, particularly a Li/CF$_x$ cell constructed according to the Muffoletto et al. '373 patent is typically housed in a conductive casing having nominal dimensions of 45 mm×23 mm×8.6 mm. This Li/CF$_x$ cell is known to have an electrolyte-to-cathode (E/C) weight ratio of about 1.32 and an anode-to-cathode (A/C) capacity ratio of about 1.16. Both the E/C weight ratio and the A/C capacity ratio are based on the gram amount of cathode active material. In other words, the Muffoletto et al. cell has about 16% excess lithium (in terms of deliverable capacity). The amount of active component within the cathode determines the theoretical capacity of the cathode, and this prior art cell is a cathode-limited design. Typically, in prior art Li/CF$_x$ cells, the presence of increased amounts of electrolyte with respect to the gram amount of cathode active material, i.e. the E/C weight ratio of 1.32 in the Muffoletto et al. cell, was thought necessary to maintain the internal impedance of the cell low, especially as end-of-life is neared.

Figure 1:
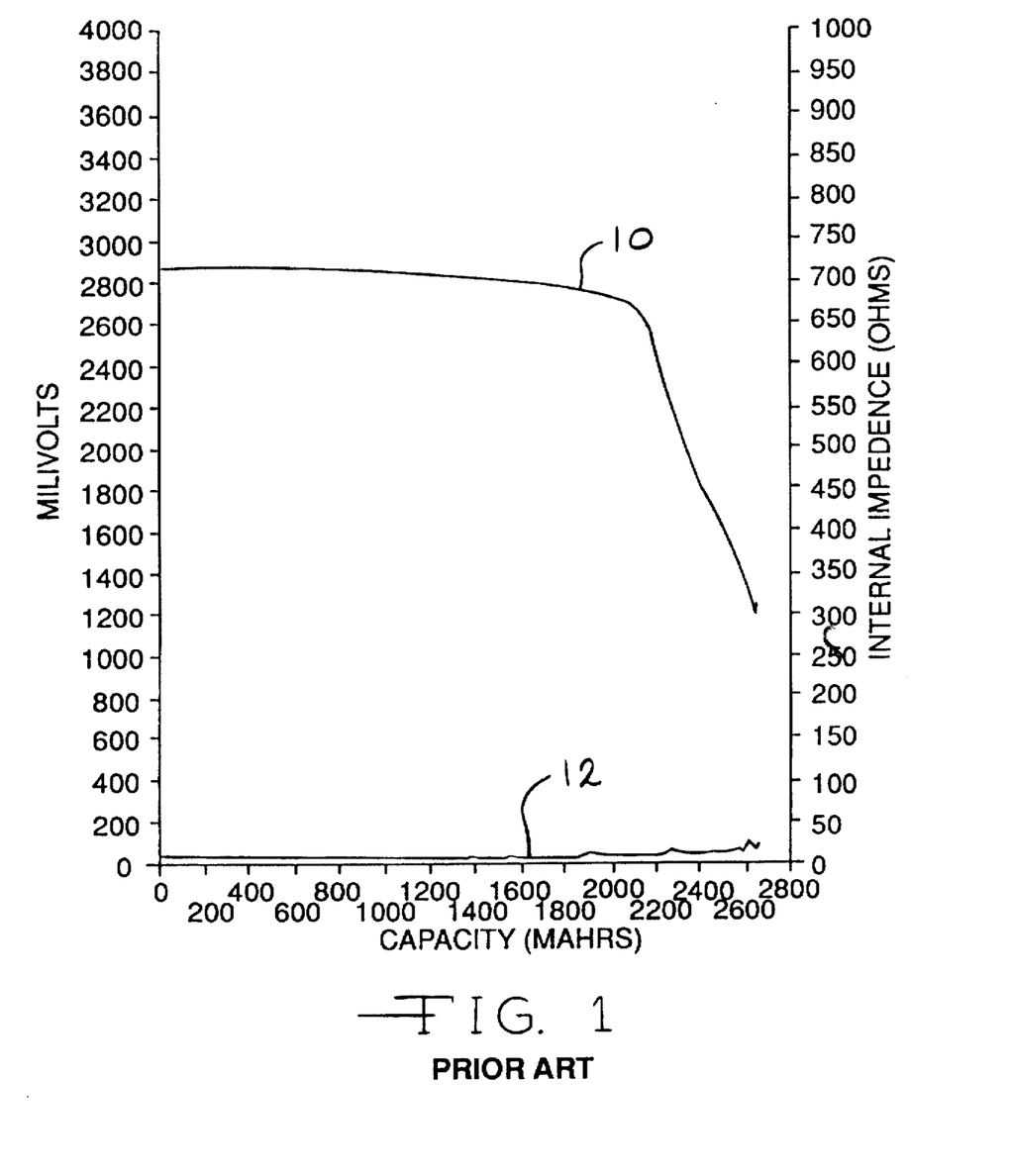
FIG. 1 is a graph constructed from the discharge of a Li/CF$_x$ cell built according to the prior art.

The Muffoletto et al. cell has a theoretical capacity of 2.47 Ah and a rated capacity of 2.40 Ah to a 2 V cutoff under a 10 Kohm load, as shown in FIG. 1. In this figure, curve 10 was constructed from the discharge of the Muffoletto et al. cell under the stated load at 37° C. and curve 12 was constructed from the cell impedance. The cell has a volumetric energy density of 866 Wh/L, a gravimetric energy density of 402 Wh/kg, an open circuit voltage of 3.0 to 3.3 volts and an estimated self-discharge rate of less than 1% per year. The cell will not rupture or leak when subjected to short circuit conditions at room temperature or at 37° C. The volumetric and the gravimetric energy densities are based on the internal volume and total weight of the active components, respectively.

Such a cell is ideal as a power source for an implantable medical device. However, in an application where a premium is placed on increased energy density, such as in power sources associated with implantable medical devices, there is a need for an alkali metal/fluorinated carbon electrochemical cell re-balanced to provide improved energy density and increased gravimetric energy over those of the prior art. The cell of the present invention fulfills this need by having a redesigned or re-balanced electrolyte-to-cathode weight ratio and a anode-to-cathode capacity ratio that optimize the electrochemical reactions at the electrodes.

DETAILED DESCRIPTION OF THE PREFERRED EMBODIMENTS

The electrochemical cell of the present invention comprises an anode of a metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electronically conductive material which serves as the other electrode of the cell. The electrochemical reaction at the cathode involves conversion of ions which migrate from the anode to the cathode into atomic or molecular forms. The cathode of the present invention preferably comprises a solid active material such as fluorinated carbon represented by the formula $(CF_x)_n$ wherein x varies between about 0.1 to 1.9 and preferably between about 0.5 and 1.2 and $(C_2F)_n$ wherein the n refers to the number of monomer units which can vary widely. These electrode active materials are composed of carbon and fluorine, and include graphitic and nongraphitic forms of carbon, such as coke, charcoal or activated carbon.

According to the present invention, the gravimetric and volumetric energy densities of the lithium/fluorinated carbon couple are increased over that known in the prior art by, in part, redesigning or re-balancing the anode-to-cathode (A/C) capacity ratio. As previously discussed, the lithium/fluorinated carbon cell described in U.S. Pat. No. 5,250,373 to Muffoletto et al. has an A/C capacity ratio of about 1.16 (based on the gram amount of the electrode active material) providing the cell with about 16% excess lithium (in terms of delivered capacity). The A/C capacity ratio of the present invention is re-balanced to about 1.03 providing this cell with about 3% excess lithium (in terms of delivered capacity). The amount of active component within the cathode determines the theoretical capacity of the cathode, and in that respect both the Muffoletto et al. prior art cell and the cell of the present invention are cathode-limited designs. As discussed hereinafter, the re-balanced A/C capacity ratio together with a re-balanced electrolyte-to-cathode (E/C) weight ratio provides the present cell with improved discharge capacity over the prior art cell of Muffoletto et al.

Before fabrication into an electrode for incorporation into an electrochemical cell, the fluorinated carbon active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a binder material which is preferably a fluoro-resin powder such as powdered polytetrafluoroethylene (PTFE) or powdered polyvinylidene fluoride (PVDF). Additional active materials which are useful in a re-balanced electrochemical cell according to the invention include silver vanadium oxide, copper-silver-vanadium oxide, manganese dioxide, lithium cobalt oxide, lithium nickel oxide, copper oxide, titanium disulfide, copper sulfide, iron sulfide, iron disulfide, copper vanadium oxide, and mixtures thereof. The preferred cathode active mixture comprises $CF_x$ combined with acetylene black and/or graphite; and PTFE.

Cathode components for incorporation into the cell may be prepared by rolling, spreading or pressing the cathode active mixture of the present invention onto a suitable current collector selected from the group consisting of stainless steel, titanium, tantalum, platinum and gold. The preferred current collector material is titanium, and most preferably the titanium cathode current collector has a thin layer of graphite/carbon paint applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the electrochemical cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.).

A preferred separator comprises a non-woven polypropylene separator and polypropylene membrane. Preferably the non-woven layer faces the cathode and the membrane faces the anode. That way, the non-woven layer acts as a wicking material to more effectively wet the cathode and as a barrier to puncture of the membrane from loose carbon particles.

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably the ion-forming alkali metal salt is similar to the alkali metal comprising the anode.

In a solid cathode/electrolyte system, the ionically conductive salt preferably has the general formula $MM'F_6$ or $MM'F_4$ wherein M is an alkali metal similar to the alkali metal comprising the anode and M' is an element selected from the group consisting of phosphorous, arsenic, antimony and boron. Examples of salts yielding $M'F_6$ are: hexafluorophosphate ($PF_6$), hexafluoroarsenate ($AsF_6$) and hexafluoroantimonate ($SbF_6$) while tetrafluoroborate ($BF_4$) is exemplary of salts yielding $M'F_4$. Alternatively, the corresponding sodium or potassium salts may be used. If desired, a secondary salt containing the perchlorate anion such as lithium perchlorate ($LiClO_4$) and tetrabutyl ammonium perchlorate ($NCH_3(CH_2)_3ClO_4$) is added to the electrolyte. Other inorganic salts useful with the present invention include $LiAlCl_4$, $LiGaCl_4$, $LiC(SO_2CF_3)_3$, $LiN(SO_2CF_3)_2$, $LiSO_3F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DE), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL) and N-methyl-pyrrolidinone (NMP) and mixtures thereof. In the present invention, the preferred anode is lithium metal and the preferred electrolyte is 1.0 M to 1.4 M $LiBF_4$ in γ-butyrolactone (GBL).

According to the present invention, the electrolyte-to-cathode (E/C) weight ratio (based on the gram amount of the electrode active material) is balanced to a range of about 0.94 to 0.96. The prior art cell of Muffoletto et al. is known to have an E/C weight ratio of about 1.32. Before the present invention, typical $Li/CF_x$ cells were activated with increased amounts of electrolyte in terms of the electrolyte-to-cathode weight ratio. It is known that the amount of electrolyte present influences the cathode's discharge efficiency, and in typical prior art cells as exemplified by Muffoletto et al., the presence of increased amounts of electrolyte was thought to maintain the internal impedance of the cell at a low level, especially as end-of-life neared. However, an unexpected advantage of the present $Li/CF_x$ cell is that an excess of electrolyte is not needed. While not wanting to be bound to any one theory as to the reason for this, the present inventors believe that this may be partly due to the reduced internal volume of the cell. The reduced internal volume necessitated that the present cell stack be relatively tight, and the electrolyte is thought to be more efficiently utilized or "trapped" within the cell stack and/or within the separator design thus eliminating the need for an excess of electrolyte.

Figure 2:
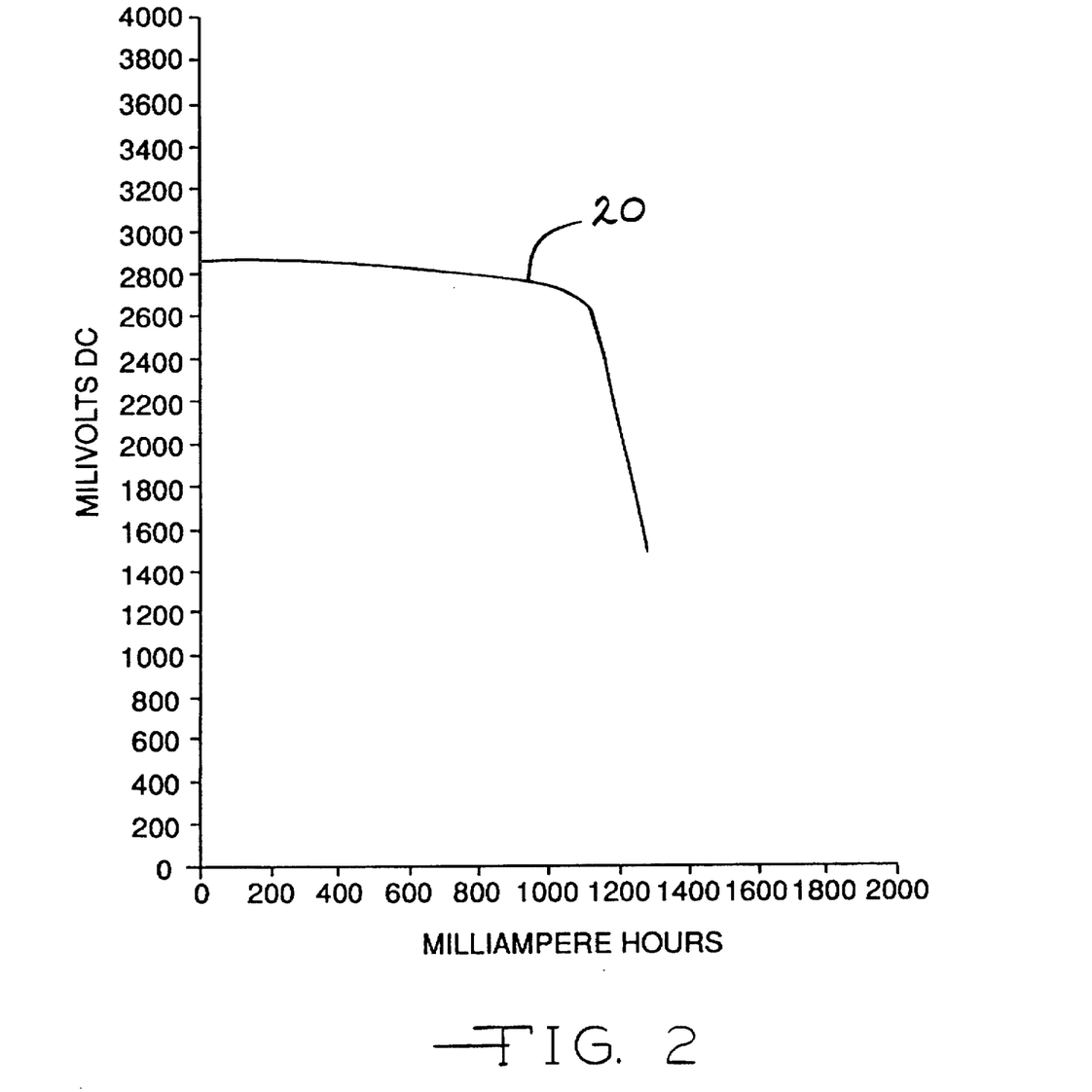
FIG. 2 is a graph constructed from the discharge of a Li/CF$_x$ cell built according to the present invention.

Therefore, the re-balanced E/C weight ratio of the present invention together with the previously discussed re-balanced A/C capacity ratio of about 1.03 results in the present cell having a theoretical capacity of 1.31 Ah and a rated capacity of 1.2 Ah to a 2 V cutoff under a 10 K load at 37° C., as shown in FIG. 2. In this figure, curve 20 was constructed from the discharge of the present cell under the stated load. The cell had a volumetric energy density of 924 Wh/L and a gravimetric energy density of 450 Wh/kg. This is an improvement of about 6.7% in terms of volumetric energy density and about a 11.9% increase in terms of the gravimetric energy density over that of the state-of-the-art cells, such as shown by Muffoletto et al.

The preferred form of the electrochemical cell is a case-negative design wherein the anode/cathode couple is inserted into a conductive metal casing such that the casing is connected to the anode current collector, as is well known to those skilled in the art. The casing has preferred nominal dimensions of 45 mm×23 mm×5 mm, which is 41.9% less voluminous than the prior art Muffoletto et al. cell. A preferred material for the casing is titanium although stainless steel, milled steel, nickel, nickel-plated milled steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

A case-negative cell according to the prior art described by the previously discussed U.S. Pat. No. 5,250,373 to Muffoletto et al. was constructed housed in a stainless steel casing having nominal dimensions of 45 mm×23 mm×8.6 mm. The cathode weighed 3.15±0.01 grams and comprised, by total weight percent, 91% $CF_x$, 5% carbon black and 4% PTFE. The cathode was fabricated by pressing the active material to an etched titanium screen, which in turn was welded to the molybdenum (Mo) pin of a stainless steel header via a titanium (Ti) couple. The anode comprised 0.76±0.02 grams of lithium divided into two equal portions and pressed to the wing-like, etched nickel (Ni) screen sections of an anode current collector, which was then spotwelded to the stainless steel header. Therefore, the electrode assembly consisted of a central cathode sandwiched between two halves of a butterfly anode. Two pieces of non-woven polypropylene separator (Tapyrus, Nichimen America) were heat-sealed around the cathode. The cell stack assembly was then welded into the stainless steel casing and 3.80±0.15 grams of 1.0 M $LiBF_4$ in γ-butyrolactone electrolyte was added to the cell via the fill hole in the header. The cell was then closed using a lower stainless steel ball and an upper stainless steel plug. The cell was hermetically sealed by close welding the upper plug into the header.

This cell had an electrolyte-to-cathode (E/C) weight ratio of about 1.21 (based on the total gram amount of the cathode including the binder and conductive diluents) or 1.32 (based on the gram amount of $CF_x$ present) and an anode-to-cathode (A/C) capacity ratio of about 1.16 (based on the gram amount of $CF_x$ present).

Figure 3:
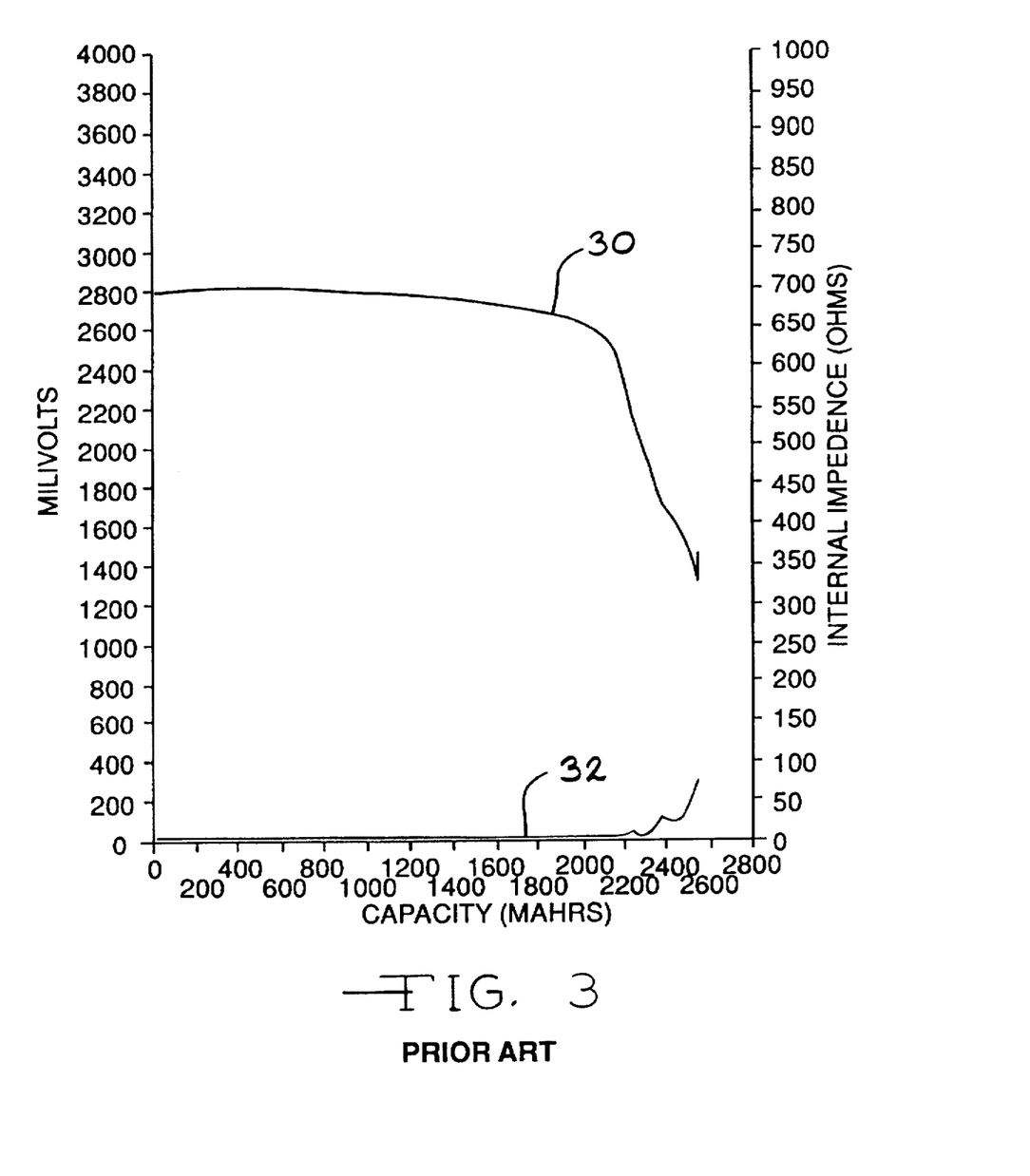
FIGS. 3 and 4 are graphs constructed from the discharge of Li/CF$_x$ cells built according to the prior art.

Under a current drain of 1.4 mA (current density 0.12 $mA/cm^2$ cathode), this prior art $Li/CF_x$ cell delivered a nominal capacity of 2.26 Ah to a 2 V cutoff, as shown in FIG. 3. In this figure, curve 30 was constructed from the discharge of the prior art cell built according to this example and discharged under a 2 Kohm load at 37° C. while curve 32 was constructed from the impedance of this cell.

EXAMPLE II

A cell of a similar design as that constructed according to Example I was built having a cathode weight of 3.52±0.01 grams, an anode weight of 0.76±0.02 grams in contact with a nickel current collector, and an electrolyte weight of 3.17±0.01 grams. Again, the cathode comprised, by total weight percent, 91% $CF_x$, 5% carbon black and 4% PTFE. This provided the cell with an E/C weight ratio of 0.96 and an A/C capacity ratio of 1.06, both based on the gram amount of $CF_x$ present. The E/C weight ratio is within the preferred range for this parameter according to the present invention while the A/C capacity ratio is outside the preferred range of this ratio according to the present invention.

Figure 4:
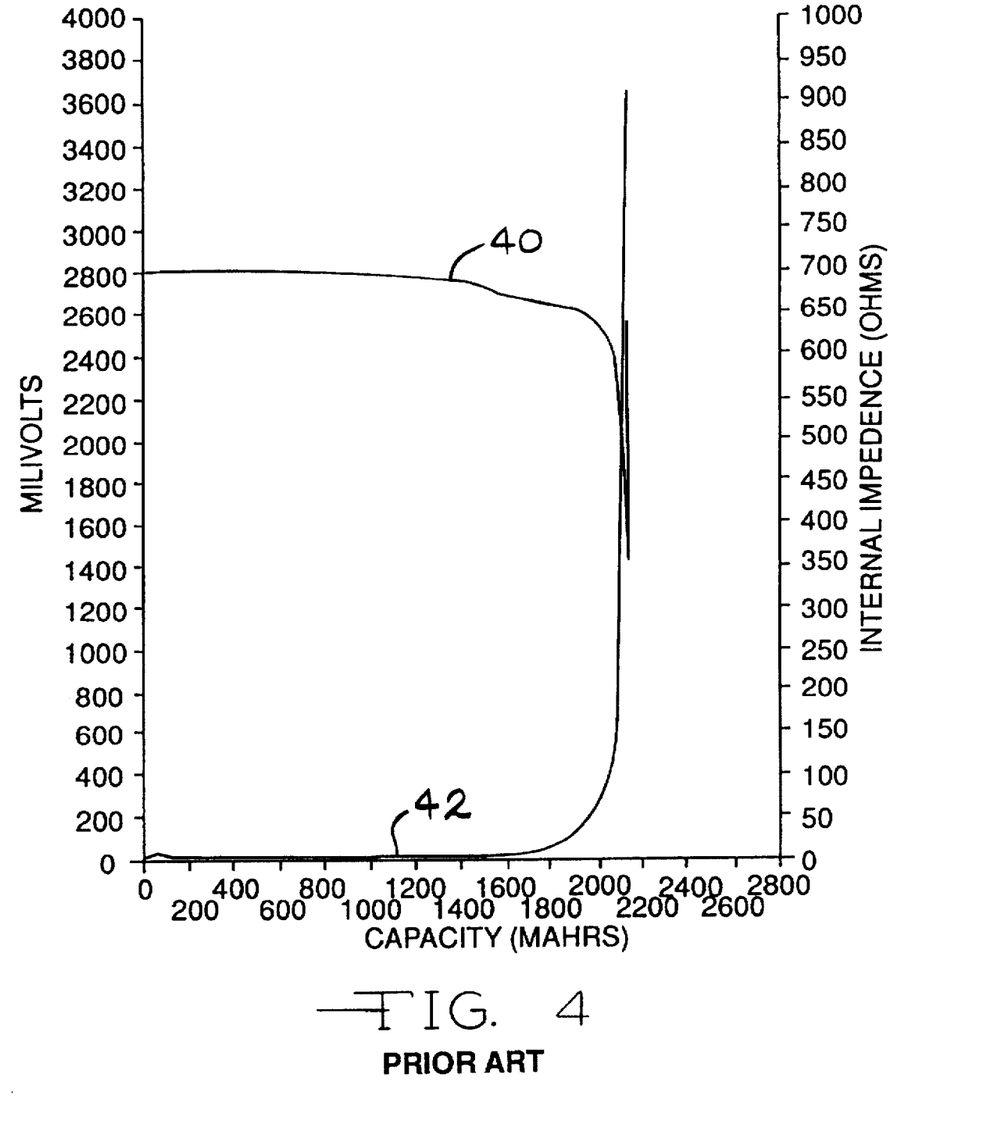

This re-balanced cell was inefficient under the 1.4 mA current drain and delivered a nominal capacity of 2.10 Ah to 2 V as shown in FIG. 4, even though the theoretical capacity of the unit was 2.76 Ah. In this figure, curve 40 was constructed from the discharge of the prior art cell built according to this example and discharged under a 2 Kohm load at 37° C. and curve 42 was constructed from the cell impedance. This is a reduction in delivered capacity of about 8.7% in comparison to the cell constructed according to Example I. The cell had a volumetric energy density of only 731 Wh/L and a gravimetric energy density of only 340 Wh/kg.

EXAMPLE III

A $Li/CF_x$ cell according to the present invention was constructed as a case-negative unit housed in a stainless steel casing having nominal dimensions of 45 mm×23 mm×5 mm. This is a 41.8% reduction in total cell volume in comparison to that of the prior art cells described in Examples I and II. The cathode weighed 1.68±0.01 grams and comprised, by total weight percent, 91% $CF_x$, 5% carbon black and 4% PTFE. The cathode was fabricated by pressing the active mixture to an etched titanium screen which, in turn, was spotwelded to the Ti pin of a titanium header via a titanium couple. The anode comprised 0.353±0.006 grams of lithium pressed to the wing-like, etched titanium screen sections of an anode current collector, which was then spotwelded to the stainless steel header. One layer of non-woven polypropylene separator (Dynaweb WD902x, Web Dynamics) and one layer of polypropylene membrane (Celgard 3500, Hoechst Celanese)

were heat-sealed around the cathode. The separators were placed such that the non-woven layer was in contact with the cathode and the film was in contact with the anode halves. The cell stack assembly was then welded onto the titanium case and about 1.45 grams of 1.0 M LiB$_4$ in γ-butyrolactone electrolyte was added to the cell via the fill hole in the header. The fill hole was sealed with a lower stainless steel ball and an upper titanium plug. The cell was hermetically sealed by close welding the upper plug into the header.

Figure 5:
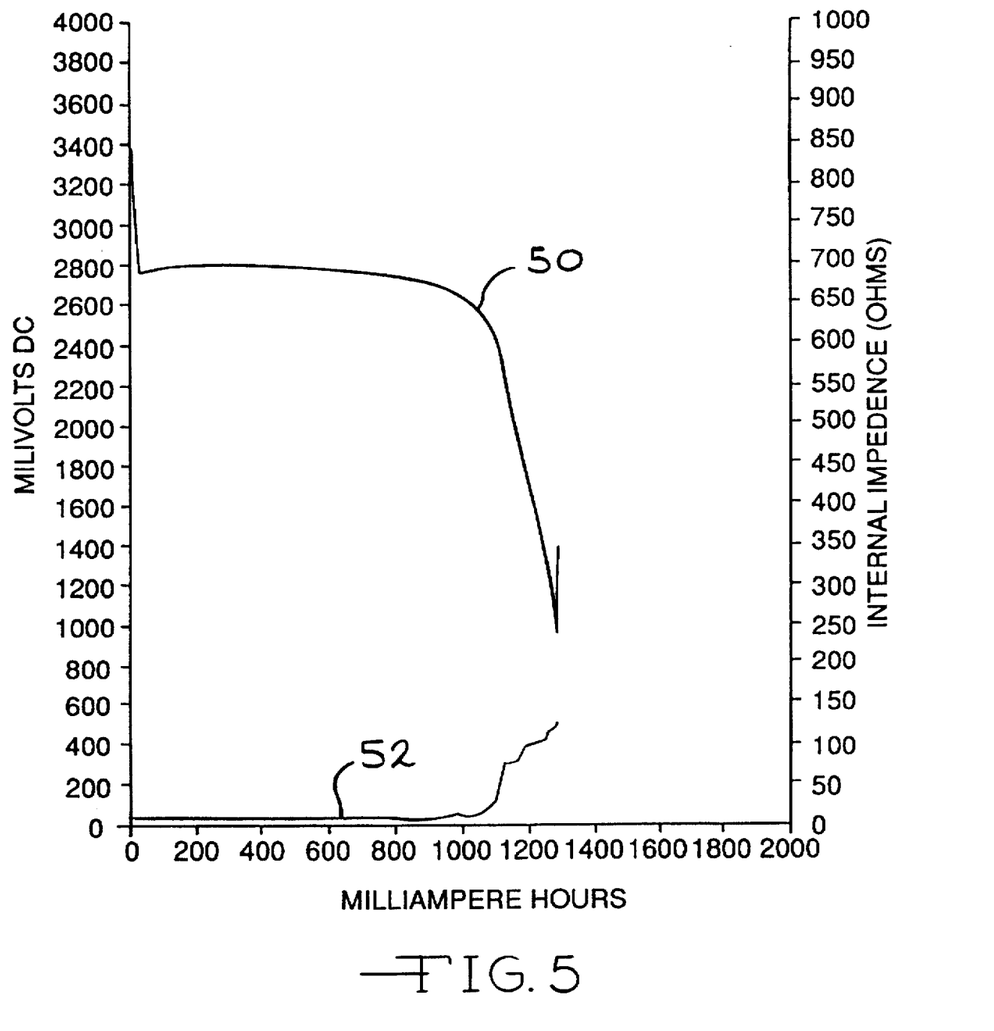
FIG. 5 is a graph constructed from the discharge of a Li/CF$_x$ cell built according to the present invention.

The cell constructed in this example according to the present invention utilized an E/C weight ratio of 0.94 to 0.96 and an A/C capacity ratio of 1.03 (both the E/C weight ratio and A/C capacity ratio are based on the gram amount of CF$_x$), and operated efficiently under a 1.4 mA drain (current density of 0.146 mA/cm$^2$ cathode). This is an unanticipated result attributable to the re-balancing of the electrolyte and the active components according to the present invention, especially considering the cell utilized a titanium screen as the anodic current collector. Titanium has a lower electrical conductivity than nickel, which was used as the anodic current collector in the prior art cells constructed in Examples I and II. As shown in FIG. 5, the cell delivered a nominal capacity of 1.18 Ah to a 2 V cutoff. In this figure, curve 50 was constructed from the discharge of the present invention cell under a 2 Kohm load at 37° C. while curve 52 was constructed from the cell impedance.

EXAMPLE IV

A test cell having active components activated with an electrolyte balanced according to the prior art but housed in a stainless steel casing having nominal dimensions of 45 mm×23 mm×5 mm, i.e., the casing having the reduced total volume according to the present invention, was constructed. This cell was built to determine if the improvements in discharge capacity are attributable to the re-balancing of the E/C weight ratio and the A/C capacity ratio according to the present invention, or to the reduced casing volume.

The cell was constructed as a case-negative unit using a cathode weighing 1.347±0.001 grams comprised of, by total weight percent, 91% CF$_x$, 5% carbon black and 4% PTFE. The cathode was fabricated by pressing the mixture to an etched titanium screen spotwelded to the molybdenum pin of a stainless steel header via a titanium couple. The anode comprised 0.321±0.001 grams of lithium pressed to the wing-like etched nickel screen sections of an anode current collector, which was then spotwelded to the stainless steel header. One layer of non-woven polypropylene separator (Dynaweb WD902x, Web Dynamics) and one layer of polypropylene film (Celgard 3500, Hoechst Celanese) were heat-sealed around the cathode. The separators were placed such that the non-woven layer was in contact with the cathode and the polypropylene film was in contact with the anode halves. The cell stack assembly was then welded into the stainless steel case and 1.63±0.01 g of 1.0 M LiB$_4$ in γ-butyrolactone electrolyte was added via the fill hole in the header. The fill hole was sealed with a lower stainless steel ball and an upper stainless steel plug. The cell was hermetically sealed by close welding the upper plug into the header.

Figure 6:
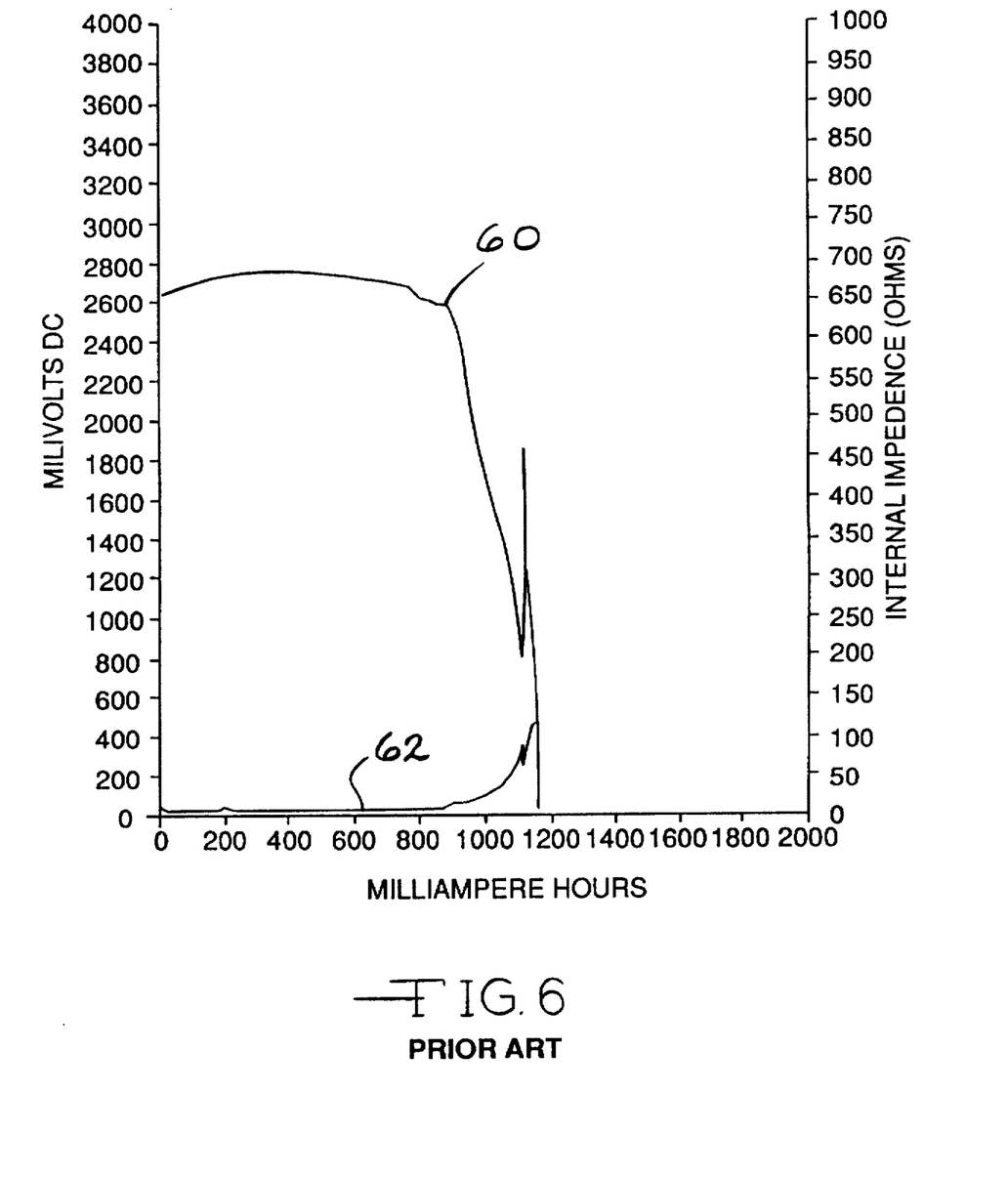
FIG. 6 is a graph constructed from the discharge of a Li/CF$_x$ cell built according to the prior art.

This cell, having an E/C weight ratio of 1.21 (based on the total gram amount of the cathode including the binder and conductive diluents) and an A/C capacity ratio of 1.16 (based on the gram amount of CF$_x$ present), both according to the prior art but housed in a casing having a reduced size according to the present invention, yielded a delivered capacity of 0.96 Ah to a 2 V cutoff under a 2 kohm load under a current drain of 1.4 mA, as shown in FIG. 6. In this figure, curve 60 was constructed from the discharge of the prior art cell built according to this example under a 2 Kohm load at 37° C. while curve 62 was constructed from the cell impedance. The volumetric and gravimetric energy densities of the cell were 714 Wh/L and 259 Wh/kg, respectively.

It is apparent that both the re-balanced E/C weight ratio and A/C capacity ratio of a Li/CF$_x$ electrochemical cell are critical parameters that provide this active couple with improved energy density in comparison to the prior art cell, and not necessarily the dimensions of the cell casing housing the active components. Thus, the re-balanced A/C capacity ratio of about 1.03 and the re-balanced E/C weight ratio of about 0.94 to 0.96 according to the present invention provided a Li/CF$_x$ cell with increased efficiency of available internal cell volume for the active components needed for cell discharge. This is brought about by using a minimum amount of excess lithium which is necessary for the shape of the discharge profile to be acceptable for the end-user to determine depth-of-discharge which can be used to calculate cell end-of-life. Furthermore, since the cell stack is tightly configured, the requirement of an excess of electrolyte is reduced without compromising discharge efficiency. The thusly available internal volume previously occupied by the excess electrolyte is then utilized for the provision of increased cathode material.

It is appreciated that various modifications to the inventive concepts described herein may be apparent to those skilled in the art without departing from the spirit and the scope of the present invention defined by the hereinafter appended claims.

What is claimed is:

1. An electrochemical cell, which comprises:
   a) an anode comprising an anode active material;
   b) a cathode operatively associated with the anode, wherein the cathode comprises a cathode active material; and
   c) an electrolyte solution activating the anode and the cathode, wherein the anode active material and the cathode active material are present in the cell in an anode-to-cathode capacity ratio of about 1.03 and wherein the electrolyte and the cathode active material are present in the cell in an electrolyte-to-cathode weight ratio of about 0.94 to 0.96.

2. The electrochemical cell of claim 1 wherein the cathode active material comprises fluorinated carbon.

3. The electrochemical cell of claim 2 wherein the fluorinated carbon is present in the cathode active mixture in about 80% to about 95%, by weight, remainder being at least one of a binder material and a conductive additive.

4. The electrochemical cell of claim 3 wherein the binder material is a fluoro-resin powder.

5. The electrochemical cell of claim 3 wherein the conductive additive is selected from the group consisting of carbon, graphite powder and acetylene black and metallic powder selected from the group consisting of titanium, aluminum, nickel and stainless steel, and mixtures thereof.

6. The electrochemical cell of claim 1 wherein the cathode further includes a current collector selected from the group consisting of titanium, stainless steel, tantalum, platinum and gold.

7. The electrochemical cell of claim 6 wherein the cathode current collector is provided with a layer of carbonaceous paint.

8. The electrochemical cell of claim 1 wherein the anode comprises an alkali metal.

9. The electrochemical cell of claim 8 wherein the alkali metal is lithium.

10. The electrochemical cell of claim 1 wherein the anode further includes a current collector selected from the group consisting of titanium, nickel, copper, tungsten and tantalum.

11. The electrochemical cell of claim 1 wherein the anode contacts the casing in a case-negative configuration.

12. The electrochemical cell of claim 1 wherein the electrolyte solution operatively associated with the anode and the cathode comprises an ion-forming alkali metal salt dissolved in a nonaqueous solvent, wherein the alkali metal of the salt is similar to the alkali metal comprising the anode.

13. The electrochemical cell of claim 12 wherein the alkali metal of the anode comprises lithium and the ion-forming alkali metal salt comprising the electrolyte solution is selected from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)$ and $LiCF_3SO_3$, and mixtures thereof.

14. The electrochemical cell of claim 13 wherein the nonaqueous solvent comprises at least one organic solvent selected from the group consisting of tetrahydrofuran, methyl acetate, diglyme, triglyme, tetraglyme, dimethyl carbonate, 1,2-dimethoxyethane, diethyl carbonate, acetonitrile, dimethyl sulfoxide, dimethyl formamide, dimethyl acetamide, propylene carbonate, ethylene carbonate, γ-valerolactone, γ-butyrolactone and N-methylpyrrolidinone, and mixtures thereof.

15. The electrochemical cell of claim 1 wherein a separator is provided between the anode and the cathode to prevent internal short circuit contact between them, and wherein the separator comprises a laminate of a non-woven material and a microporous membrane.

16. The electrochemical cell of claim 15 wherein the separator comprises a non-woven polypropylene layer and a polypropylene membrane.

17. The electrochemical cell of claim 16 wherein the non-woven polypropylene layer faces the cathode and the polypropylene membrane faces the anode.

18. The electrochemical cell of claim 1 housed in a conductive casing comprising a material selected from the group consisting of titanium, stainless steel, milled steel, nickel, nickel-plated milled steel and aluminum.

19. The electrochemical cell of claim 1 wherein the anode comprises lithium anode active material in electrical contact with a nickel current collector and the cathode comprises fluorinated cathode active material in electrical contact with a titanium current collector and wherein the anode and the cathode are activated with the electrolyte solution comprising 1.0 M $LiBF_4$ in γ-butyrolactone and housed in a conductive casing comprising titanium.

20. An electrochemical cell, which comprises:
   a) an anode comprising lithium;
   b) a cathode operatively associated with the anode, wherein the cathode comprises fluorinated carbon as a cathode active material; and
   c) an electrolyte solution activating the anode and the cathode, the electrolyte solution comprising an ion-forming lithium salt dissolved in a nonaqueous solvent wherein the lithium and the fluorinated carbon are present in the cell in an anode-to-cathode capacity ratio of about 1.03 and wherein the electrolyte solution and the fluorinated carbon are present in the cell in an electrolyte-to-cathode weight ratio of about 0.94 to 0.96.

21. The electrochemical cell of claim 20 wherein the fluorinated carbon is present in the cathode active mixture in about 80% to about 95%, by weight, remainder being at least one of a binder material and a conductive additive.

22. The electrochemical cell of claim 20 wherein the cathode further includes a current collector comprising titanium and the anode further includes a current collector comprising nickel.

23. The electrochemical cell of claim 22 wherein the cathode current collector is provided with a layer of carbonaceous paint.

24. The electrochemical cell of claim 20 wherein the ion-forming lithium salt comprising the electrolyte solution is selected from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)$ and $LiCF_3SO_3$, and mixtures thereof.

25. The electrochemical cell of claim 20 wherein the nonaqueous solvent comprises at least one organic solvent selected from the group consisting of tetrahydrofuran, methyl acetate, diglyme, triglyme, tetraglyme, dimethyl carbonate, 1,2-dimethoxyethane, diethyl carbonate, acetonitrile, dimethyl sulfoxide, dimethyl formamide, dimethyl acetamide, propylene carbonate, ethylene carbonate, γ-valerolactone, γ-butyrolactone and N-methylpyrrolidinone, and mixtures thereof.

26. The electrochemical cell of claim 20 wherein a separator is provided between the anode and the cathode to prevent internal short circuit contact between them, and wherein the separator comprises a laminate of a non-woven material and a microporous membrane.

27. The electrochemical cell of claim 26 wherein the separator laminate comprises a non-woven polypropylene layer and a polypropylene membrane.

28. The electrochemical cell of claim 27 wherein the non-woven polypropylene layer faces the cathode and the polypropylene membrane faces the anode.

29. The electrochemical cell of claim 20 is housed in a conductive casing comprising a material selected from the group consisting of titanium, stainless steel, mild steel, nickel, nickel-plated mild steel and aluminum.

30. The electrochemical cell of claim 20 wherein the lithium is in electrical contact with a nickel current collector and the fluorinated carbon is in electrical contact with a titanium current collector and wherein the anode and the cathode are activated with the electrolyte solution comprising 1.0 M $LiB_4$ in γ-butyrolactone and housed in a conductive casing comprising titanium.

31. A method of providing an electrochemical cell, comprising the steps of:
   a) providing a casing;
   b) providing an anode comprising an anode active material;
   c) providing a cathode comprised of a cathode active material;
   d) operatively associating the anode with the cathode housed inside the casing with the anode active material and the cathode active material in an anode-to-cathode capacity ratio of about 1.03 and wherein the anode and the cathode are connected to respective terminals; and
   e) activating the anode and the cathode with an electrolyte filled into the casing, wherein the electrolyte and the cathode active material are present in the cell in an electrolyte-to-cathode weight ratio of about 0.94 to 0.96.

32. The method of claim 31 including providing the cathode active material comprised of fluorinated carbon.

33. The method of claim 31 including providing the fluorinated carbon present in the cathode in about 80% to about by weight, remainder being at least one of a binder material and a conductive additive.

34. The method of claim 31 including providing the cathode having a current collector selected from the group consisting of titanium, stainless steel, tantalum, platinum and gold.

35. The method of claim 34 including providing the cathode current collector with a layer of carbonaceous paint.

36. The method of claim 31 including providing the anode comprised of an alkali metal.

37. The method of claim 31 including providing the anode having a current collector selected from the group consisting of titanium, nickel, copper, tungsten and tantalum.

38. The method of claim 31 including providing the cathode current collector comprised of titanium.

39. The method of claim 31 including providing the electrolyte solution operatively associated with the anode and the cathode comprising an ion-forming alkali metal salt dissolved in a nonaqueous solvent, wherein the alkali metal of the salt is similar to an alkali metal comprising the anode.

40. The method of claim 39 including providing the anode comprised of lithium and selecting the ion-forming alkali metal salt comprising the electrolyte solution from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)$ and $LiCF_3SO_3$, and mixtures thereof.

41. The method of claim 39 including providing the nonaqueous solvent comprising at least one organic solvent selected from the group consisting of tetrahydrofuran, methyl acetate, diglyme, triglyme, tetraglyme, dimethyl carbonate, 1,2-dimethoxyethane, diethyl carbonate, acetonitrile, dimethyl sulfoxide, dimethyl formamide, dimethyl acetamide, propylene carbonate, ethylene carbonate, γ-valerolactone, γ-butyrolactone and N-methylpyrrolidinone, and mixtures thereof.

42. The method of claim 31 including providing a separator between the anode and the cathode to prevent internal short circuit conditions and further including providing the separator comprising a a non-woven material and a microporous membrane.

43. The method of claim 42 including providing the separator comprising a non-woven polypropylene layer and a polypropylene membrane.

44. The method of claim 43 including providing the non-woven polypropylene layer facing the cathode and the polypropylene layer facing the anode.

45. The method of claim 31 including providing the casing comprising a conductive material selected from the group consisting of titanium, stainless steel, milled steel, nickel, nickel-plated milled steel and aluminum.

46. The method of claim 31 including providing lithium as the anode active material contacting a nickel current collector and fluorinated carbon as the cathode active material contacting a titanium current collector and activating the anode and the cathode with the electrolyte comprising 1.0 M $LiBF_4$ in γ-butyrolactone and further including housing the cell in a conductive casing comprising titanium.

* * * * *